US009823382B2

(12) United States Patent
Li et al.

(10) Patent No.: US 9,823,382 B2
(45) Date of Patent: Nov. 21, 2017

(54) VEHICLE MOUNTED MOBILE CONTAINER OR VEHICLE INSPECTION SYSTEM

(71) Applicant: Nuctech Company Limited, Beijing (CN)

(72) Inventors: Jianmin Li, Beijing (CN); Yulan Li, Beijing (CN); Jingyu Gu, Beijing (CN); Yuanjing Li, Beijing (CN); Quanwei Song, Beijing (CN); Weizhen Wang, Beijing (CN); Dongyu Wang, Beijing (CN); Zhiqiang Chen, Beijing (CN); Chaunxiang Tang, Beijing (CN); Yinong Liu, Beijing (CN); Junli Li, Beijing (CN); Tao Xue, Beijing (CN); Hui Gong, Beijing (CN); Xuewu Wang, Beijing (CN)

(73) Assignee: NUCTECH COMPANY LIMITED, Beijing (CN)

( * ) Notice: Subject to any disclaimer, the term of this patent is extended or adjusted under 35 U.S.C. 154(b) by 62 days.

(21) Appl. No.: 14/965,122

(22) Filed: Dec. 10, 2015

(65) Prior Publication Data

US 2016/0170073 A1 Jun. 16, 2016

(30) Foreign Application Priority Data

Dec. 11, 2014 (CN) .......................... 2014 1 0764478

(51) Int. Cl.
*G01N 23/02* (2006.01)
*G01K 1/04* (2006.01)
(Continued)

(52) U.S. Cl.
CPC ............ *G01V 5/0016* (2013.01); *B60R 11/00* (2013.01); *B60R 2011/004* (2013.01)

(58) Field of Classification Search
CPC ........... G01N 2223/301; G01N 23/043; G01N 23/04; G01V 5/0041; G01T 7/08; G21K 1/025
(Continued)

(56) References Cited

U.S. PATENT DOCUMENTS

2009/0271068 A1* 10/2009 Shi ....................... G01V 5/0008
701/36
2011/0038453 A1* 2/2011 Morton ................ G01V 5/0016
378/57
(Continued)

FOREIGN PATENT DOCUMENTS

CN 201476774 U 5/2010
CN 201497711 U 6/2010
(Continued)

OTHER PUBLICATIONS

European Patent Application No. 15199532.1; Extended Search Report; dated May 4, 2016; 7 pages.

*Primary Examiner* — Don Wong
(74) *Attorney, Agent, or Firm* — Baker & Hostetler LLP

(57) ABSTRACT

A vehicle mounted mobile container or vehicle inspection system, including: a radiation source, a movable vehicle for carrying the inspection system, and a detector arm rack which has a horizontal arm and a vertical arm, a first end of the horizontal arm is connected to the vehicle and a second end thereof is connected to an end of the vertical arm. The horizontal arm and the vertical arm are connected by a pivotal connecting device such that the vertical arm may pivot in a vertical plane, and the horizontal arm and the vertical arm may be retracted in a same horizontal plane. The novel arm rack construction may reduce the space occupied by it on top of the scanning vehicle after the arm rack is stowed so as to reduce the eight of the scanning vehicle under running condition.

6 Claims, 3 Drawing Sheets

(51) Int. Cl.
*G01V 5/00* (2006.01)
*B60R 11/00* (2006.01)

(58) Field of Classification Search
USPC ................................ 378/57, 4, 21, 198, 147
See application file for complete search history.

(56) References Cited

U.S. PATENT DOCUMENTS

2011/0186739 A1    8/2011   Foland et al.
2012/0076263 A1    3/2012   Hayes et al.

FOREIGN PATENT DOCUMENTS

| | | |
|---|---|---|
| CN | 101953234 A | 1/2011 |
| CN | 102834738 A | 12/2012 |
| CN | 204314483 U | 5/2015 |
| DE | 102004050421 A | 5/2005 |
| WO | WO 2011/106745 A1 | 9/2011 |

\* cited by examiner

VEHICLE MOUNTED MOBILE CONTAINER OR VEHICLE INSPECTION SYSTEM

CROSS-REFERENCE TO RELATED APPLICATION

This application claims the benefit of Chinese Patent Application No. 201410764478.1 filed on Dec. 11, 2014 in the State Intellectual Property Office of China, the whole disclosure of which is incorporated herein by reference.

BACKGROUND OF THE INVENTION

Field of the Invention

The present disclosure relates to a field of an x-or gamma-ray security inspection, especially to a vehicle mounted mobile container or vehicle inspection system using x-or gamma-rays, by which a container or vehicle is inspected.

Description of the Related Art

The vehicle mounted mobile container or vehicle inspection system may achieve the movement of the inspection system through the movement of the vehicle, thus the vehicle mounted mobile inspection system has an advantage of a. well mobility and has a good prospect. The vehicle mounted mobile inspection system has two working conditions, i.e. a scanning inspection condition and a non-inspection running condition.

The vehicle mounted mobile inspection system has a detector arm on which a detector is mounted. When the vehicle mounted mobile inspection system is under the running condition, the detector arm is retracted over the compartment, and the inspection system can run on the road like a standard vehicle; when the vehicle mounted mobile inspection system is under the scanning condition, the detector arm is deployed and forms a scanning passage with a constant size, as shown in FIG. 1.

The current vehicle mounted mobile container or vehicle inspection system using x-or gamma-rays employs a foldable L-shape arm rack. After the arm rack is deployed, the horizontal arm and the vertical arm are located in a same plane; after the arm rack is retracted, the horizontal arm and the vertical arm are stacked on top of the scanning vehicle, as shown in FIG. 1. However, as the horizontal arm and the vertical arm, which have its own thickness, are stacked together for example, the vertical arm is stacked on the horizontal arm, it results in an increasing of the height of the detector arm rack which is stacked together by folding and consequently an increasing of the overall height of the vehicle, which is unfavorable for the inspection system whose height is already very high. Further, such a height is also unfavorable for the running of the vehicle.

SUMMARY OF THE INVENTION

An embodiment of the present invention has been made to overcome or alleviate at least one aspect of the above mentioned disadvantages by providing a detector arm rack which is simple, reliable and strong and is suitable for being frequently retracted and deployed in practical applications. Further, the detector arm rack may keep not being deformed over a long term use so as to avoid an alignment error between the radiation source and the detector on the detector arm rack.

According to an aspect of an embodiment of the present invention, there is provided a vehicle mounted mobile container or vehicle inspection system, including: a radiation source, a movable vehicle for carrying the inspection system, and a detector arm rack which has a horizontal arm and a vertical arm, a first end of the horizontal arm is connected to the vehicle and a second end thereof is connected to an end of the vertical arm. The horizontal arm and the vertical arms are connected by a pivotal connecting device such that the vertical arm may pivot in a vertical plane, and the horizontal arm and the vertical arm may be positioned in a same horizontal plane when being retracted. The vehicle mounted mobile container or vehicle inspection system further comprises a collimator which has at least two collimator slits, which are arranged to align with the detector module on the vertical arm and the horizontal arm respectively.

DETAILED DESCRIPTION OF PREFERRED EMBODIMENTS OF THE INVENTION

Figure 1A:
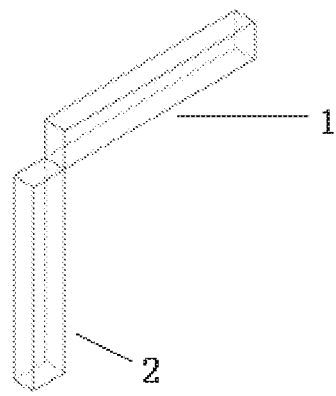
FIGS. 1a and 1b are views of a detector arm rack in the prior art.
Figure 1B:
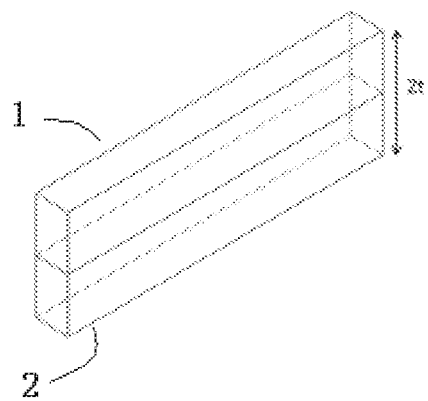

Exemplary embodiments of the present disclosure will be described hereinafter in detail with reference to the attached drawings, wherein the like reference numerals refer to the like elements. The exemplary embodiments will be described in detail with reference to the accompanying drawings to explain the present invention.

Figure 2A:
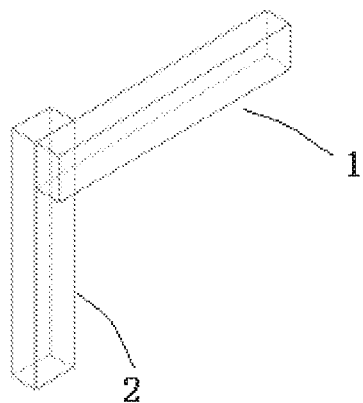
FIGS. 2a and 2b are views of a detector arm rack according to an embodiment of the present invention.
Figure 2B:
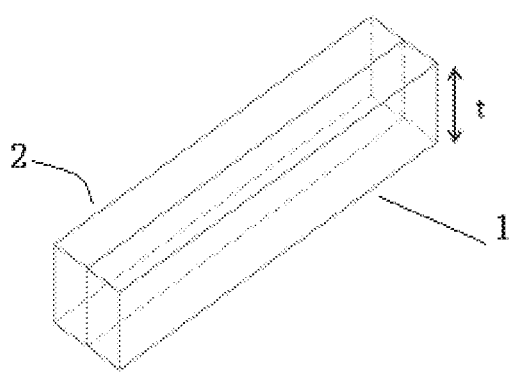

According to an embodiment of the present invention, as shown in FIGS. 2a and 2b, a vehicle mounted mobile container or vehicle inspection system 10 using x-or gamma-rays is mounted on a carrying vehicle or is integrated with the vehicle. The vehicle mounted mobile inspection system 10 mentioned here comprises a vehicle for moving.

The vehicle mounted mobile inspection system 10 comprises a radiation source 4, such as an x-ray source or gamma-ray source 4, for example an x-ray accelerator 4 which is used to emit rays to irradiate the object to be inspected, such as a container, a vehicle carrying a container, and items to be inspected in ports or customs. The vehicle mounted mobile inspection system 10 further comprises a collimator 3. The collimator 3 is used to collimate the radiation from the radiation source 4 into collimated beams and make the collimated beams irradiate the object to be inspected. The collimator 3 is arranged to be aligned with the detector, thus the rays transmitted through the object to be inspected will be collected by the detector.

The detector arm rack of the vehicle mounted mobile inspection system 10 comprises a horizontal arm 1 and a vertical arm 2, the horizontal arm 1 and the vertical arm 2 are connected by a connecting device, such that the horizontal arm 1 and the vertical arm 2 may pivot with respect to each other in a vertical plane. The horizontal arm 1 is preferably mounted on the vehicle of the vehicle mounted mobile inspection system 10. Preferably, the horizontal arm 1 is mounted on the vehicle of the vehicle mounted mobile inspection system 10 in such a manner that it can pivot in a horizontal plane, for example, an end of the horizontal arm 1 is mounted on a pivot axis of the vehicle of the vehicle mounted mobile inspection system 10 so as to pivot about the pivot axis in a horizontal plane. It is also possible to use other forms of the connecting device, as long as the horizontal arm 1 may pivot with respect to the vehicle. The horizontal arm 1 and the vertical arm 2 are arranged such that the horizontal arm 1 and the vertical arm 2 are positioned in a same horizontal plane under a non-inspection condition, i.e. when the detector arm rack is retracted; the horizontal arm 1 and the vertical arm 2 form a L shape arm rack and they are not co-planar under an inspection condition, i.e. when the detector arm rack is deployed. Specifically, when the vehicle mounted mobile inspection system 10 is ready to performing the inspection, the horizontal arm 1 firstly pivots horizontally with respect to the pivot axis on the vehicle of the vehicle mounted mobile inspection system 10, in the process of which the vertical arm 2 moves together with the horizontal arm 1, for example to the transverse direction of the vehicle of the vehicle mounted mobile inspection system 10, i.e., a direction which is perpendicular to the vehicle's traveling direction. At a time of inspection, the horizontal arm 1 may also extend along other directions, although it is generally preferable that the horizontal arm 1 extends along the direction which is perpendicular to the vehicle's travelling direction. The vertical arm 2 is pivotally connected to an end of the horizontal arm 1 and the vertical arm 2 may pivot in a vertical plane.

With the detector arm rack according to the present invention, the height of the detector arm rack after it is retracted is reduced without affecting the inspection result, and the overall height of the inspection system 10 is thus reduced, which increases the capability of passing-by of the carrying vehicle of the inspection system 10.

In an embodiment of the present invention, one end of the horizontal arm 1 is pivotally connected with the vehicle and the other end is pivotally connected with an end of the vertical arm 2. In an embodiment, for example in a nearly horizontal plane, the horizontal arm 1 and the vertical arm 2 may be retracted side by side, and a horizontal pivot axis is connected to the ends of the horizontal arm 1 and the vertical arm 2, for example, the pivot axis is connected to lateral sides of horizontal arm 1 and the vertical arm 2 respectively, such that the horizontal arm 1 and the vertical arm 2 may be positioned in a same horizontal plane under the retraction condition; the vertical arm 2 pivots with respect to the horizontal arm 1 from a horizontal direction to a vertical direction in a vertical plane when the vertical arm 2 is deployed. The horizontal arm 1 and the vertical arm 2 being retracted in a same horizontal plane means that the horizontal arm 1 and the vertical arm 2 are not stacked as one on the other in a height direction, but they are placed in a same horizontal plane, as such one arm will not be provided on the other arm in the height direction, the two arms may be placed for example side by side instead.

The skilled one in the art will appreciate that other pivotally connecting device may be used, such as a hinge. The pivotal connection between the horizontal arm 1 and the vertical arm 2 may be provided as an electric drive connection. The pivotal connection between the horizontal arm 1 and the vertical arm 2 may be provided with a locking device (not shown). In the process of inspection, the locking device interlocks the horizontal arm 1 and the vertical arm 2 so as to prohibit them from pivoting with respect to each other, such that the inspection may be performed steadily. The pivotally connecting device between the horizontal arm 1 and the vertical arm 2 comprises a second locking device which interlocks the horizontal arm 1 and the vertical arm 2 after the horizontal arm 1 and the vertical arm 2 are retracted, such that the two arms cannot pivot with respect to each other. Alternatively, the locking device of the pivotal connection between the horizontal arm 1 and the vertical arm 2 makes the horizontal arm 1 and the vertical arm 2 be interlocked so as to prohibit them from pivoting with respect to each other both in the process of inspection and after the horizontal arm 1 and the vertical arm 2 are retracted.

Under the deployed condition, the horizontal arm 1 extends in a horizontal plane, and the vertical arm 2 extends in a vertical plane, such that the horizontal arm 1 and the vertical arm 2 form a L shape construction as shown in the figures, such that, the radiation source 4 and the detector modules provided on the horizontal arm 1 and the vertical arm 2 respectively consist a inspection passage through which the object to be inspected, such as a vehicle, may pass through the inspection passage to be inspected.

The vehicle mounted mobile inspection system 10 may further comprise a protection device for blocking the radiation from irradiating out of the detector arm area. For example, a foldable metal protection device may be provided on the detector arms. The protection device is deployed when an inspection is performed, the radiation irradiated out of the detector arm area is collected and blocked, reducing the impact on the surrounding environment.

In an embodiment of the present invention, the horizontal arm 1 and the vertical arm 2 have certain widths, such that the detectors provided on the horizontal arm 1 and the vertical arm 2 along the length directions of the horizontal arm 1 and the vertical arm 2 are disposed in two spaced vertical planes. That is to say, when the horizontal arm 1 and the vertical arm 2 are deployed to form a right angle, the detectors provided on the horizontal arm 1 and the vertical arm 2 are located in different vertical planes respectively. In this way, under the scanning condition, i.e. when the detector arm rack is deployed, the collimator in the prior art cannot simultaneously align with the detector modules on the horizontal arm 1 and the vertical arm 2 which are not in a same vertical plane, which causes that the detector modules on the horizontal arm 1 and the vertical arm 2 cannot simultaneously receive the rays passing through the object to be inspected.

Figure 3:
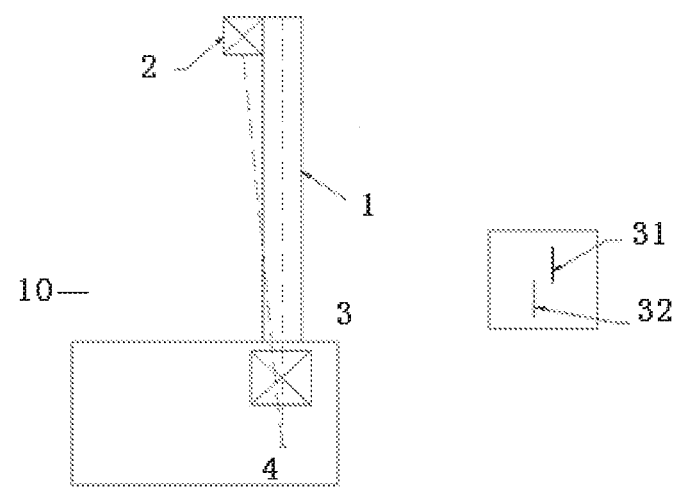
FIG. 3 is a view showing an arrangement of a detector arm rack and a collimator according to an embodiment of the present invention.

In order to ensure that the detector modules on the horizontal arm 1 and the vertical arm 2 simultaneously receive the rays passing through the object to be inspected, according to an embodiment of the present invention, the collimator 3 is arranged such that two offset collimator slits 31, 32 are provided on a shielding device, as shown in FIG. 3, such that the collimator 3 may simultaneously emit two beams which are transmitted into the object to be inspected respectively and finally are received by the detector modules provided on the horizontal arm 1 and the vertical arm 2 respectively.

In an embodiment of the present invention, the horizontal arm 1 and the vertical arm 2 have a width d, then the distance between the detectors provided on the horizontal arm 1 and the vertical arm 2 along the length directions of the horizontal arm 1 and the vertical arm 2 is d. That is to say, when the horizontal arm 1 and the vertical arm 2 are deployed to for example form a right angle, the distance between two vertical planes determined by the detectors provided on the horizontal arm 1 and the detectors provided on the vertical arm 2 respectively is also d.

The distance between the two collimator slits 31, 32 on the collimator 3 may be calculated by the distance from the radiation source 4 to the collimator slits 31, 32 and the arm rack:

$$\delta = d\frac{D1}{D2}$$

Given that the advancing velocity of the vehicle to be scanned is v, the delay time between the signals of the horizontal arm 1 and the vertical arm 2 will be $\Delta t = d/v$.

When an image is built, for the same cross section of the object to be inspected, it is necessary to make analysis on the signals received by the detectors of the horizontal arm 1 at a time t0 and the signals received by the detectors of the vertical arm 2 at a time t0+Δt by using an algorithm and then rebuild the image.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

What is claimed is:

1. A vehicle mounted mobile container or vehicle inspection system, comprising: a radiation source, a carrying vehicle, and a detector arm rack, characterized in that
   the detector arm rack has a horizontal arm and a vertical arm, a first end of the horizontal arm is connected to the carrying vehicle and a second end thereof is connected on a first lateral side of the horizontal arm to a first lateral side of a first end of the vertical arm by a pivotal device, such that the vertical arm pivots about the pivotal device in a vertical plane, and the horizontal arm and the vertical arm are retracted in a same horizontal plane, a pivotal axis of the pivotal device is perpendicular to the first lateral side of the vertical arm and the first lateral side of the horizontal arm;
   the inspection system further comprises at least two groups of detector modules which are provided on the horizontal arm and the vertical arm respectively; and
   the inspection system further comprises a collimator which has at least two collimator slits, such that the rays emitted by the radiation source irradiate the detectors provided on the vertical arm and the horizontal arm through the two collimator slits respectively.

2. The vehicle mounted mobile container or vehicle inspection system according to claim 1, Wherein the horizontal arm and the vertical arm are retracted in a same horizontal plane on top of the vehicle.

3. The vehicle mounted mobile container or vehicle inspection system according to claim 1, Wherein the first end of the horizontal arm is connected to the carrying vehicle in such a manner that it pivots in a horizontal plane.

4. The vehicle mounted mobile container or vehicle inspection system according to claim 1, wherein it further comprises a locking device for interlocking the horizontal arm and the vertical arm under an inspecting condition or a retracted condition.

5. The vehicle mounted mobile container or vehicle inspection system according to claim 1, wherein it further comprises a radiation protection device for receiving radiations irradiated out of the detector arms by the radiation source.

6. A method for inspecting a vehicle mounted container or a vehicle with the vehicle mounted mobile container or vehicle inspection system according to claim 1, comprising the steps of
   deploying the horizontal arm and the vertical arm of the detector arm rack, and adjusting the at least two collimator slits of the collimator to align the radiation source, the first collimator slit of the at least two collimator slits and the horizontal arm, and align the radiation source, the second collimator slit of the at least two collimator slits and the vertical arm,
   moving the object to be inspected with respect to the carrying vehicle,
   performing a scan inspection on the object to be inspected to obtain a first partial image of the radiation source irradiating the horizontal arm through the first collimator slit and obtain the time t1 when the first partial image is obtained, and further obtain a second partial image of the radiation source irradiating the vertical arm through the second collimator slit and obtain the time t2 when the second partial image is obtained;
   obtaining a velocity v of the object to be inspected in real time, and calculating a delay time between the first partial image and the second partial image with a distance d between the first collimator slit and the second collimator slit,
   combining the first partial image at the time t1 and the second partial image at a time (t1+Δt) which is delayed by a delay time Δt to rebuild a completed scan image, or combining the first partial image at the time t1 and the second partial image at time (t1−Δt) which is earlier by a delay time Δt to rebuild a completed scan image.

* * * * *